(12) United States Patent
Steinmann et al.

(10) Patent No.: US 10,150,061 B2
(45) Date of Patent: Dec. 11, 2018

(54) SEPARATOR NIPPLE

(71) Applicant: MAGNA STEYR Fuel Systems GesmbH, Sinabelkirchen (AT)

(72) Inventors: Dominik Steinmann, Stubenberg (AT); Patrick Zierler, Brodingberg (AT); Michael Binder, Gleisdorf (AT); Carina Schweiger, Weiz (AT)

(73) Assignee: MAGNA STEYR Fuel Systems GesmbH, Sinabelkirchen (AT)

( * ) Notice: Subject to any disclaimer, the term of this patent is extended or adjusted under 35 U.S.C. 154(b) by 122 days.

(21) Appl. No.: 15/364,341

(22) Filed: Nov. 30, 2016

(65) Prior Publication Data

US 2017/0312655 A1     Nov. 2, 2017

(30) Foreign Application Priority Data

Apr. 27, 2016   (EP) .................................... 16167253

(51) Int. Cl.
  *B01D 19/00*   (2006.01)
  *B60K 15/03*   (2006.01)
  *B60K 15/035*  (2006.01)

(52) U.S. Cl.
  CPC ..... *B01D 19/0042* (2013.01); *B01D 19/0031* (2013.01); *B60K 15/03* (2013.01); *B60K 2015/03269* (2013.01); *B60K 2015/03394* (2013.01); *B60K 2015/03538* (2013.01);
  (Continued)

(58) Field of Classification Search
  CPC ...... B01D 45/06; B60K 15/03; B60K 15/035; F02M 25/08; F02M 37/00; F02M 33/02; F02M 25/0836

USPC .............. 55/385.3, 385.4, 459, 455; 95/271; 123/520, 198 E; 137/588, 587; 141/49, 141/302; 220/86.2, 746
  See application file for complete search history.

(56) References Cited

U.S. PATENT DOCUMENTS 6,708,724 B2 *   3/2004   Morinaga ........ B60K 15/03519
                                                     137/588
2002/0189691 A1   12/2002   Morinaga
(Continued)

FOREIGN PATENT DOCUMENTS

DE   102008061264 A1   6/2010
DE   102014007709 A1   12/2015
(Continued)

*Primary Examiner* — Duane Smith
*Assistant Examiner* — Minh Chau T Pham
(74) *Attorney, Agent, or Firm* — Jordan IP Law, LLC; Todd A. Vaughn

(57) ABSTRACT

A separation nipple to separate a liquid from a vent inlet line into a filler pipe of a motor vehicle. The separation nipple has an inlet for connection to the vent inlet line, an outlet for connection to a vent outlet line, an opening for connection to an interior of the filler pipe, and a flap to close the opening. The flap has a main flap surface and a reflector flap surface which slopes relative to the main flap surface. The reflector flap surface is configured to form a reflector with the main flap surface when the flap is in an open position, the reflector being configured to deflect liquid passing through the opening in a direction of an end of the tank of the filler pipe. The opening is configured for closing by the main flap surface when the flap is in a closed position.

18 Claims, 1 Drawing Sheet

(52) U.S. Cl.
CPC .............. *B60K 2015/03566* (2013.01); *B60K 2015/03595* (2013.01)

(56) References Cited

U.S. PATENT DOCUMENTS

| | | | | |
|---|---|---|---|---|
| 2003/0093981 | A1* | 5/2003 | Johannesson | F16H 57/027 55/385.4 |
| 2009/0071111 | A1* | 3/2009 | Lundgren | B01D 46/0046 55/385.4 |
| 2010/0147863 | A1* | 6/2010 | Grun | B60K 15/03504 220/746 |
| 2012/0137884 | A1* | 6/2012 | Steinman | F02M 25/0872 95/271 |
| 2013/0255645 | A1* | 10/2013 | Grass | F02M 25/0818 123/520 |
| 2016/0115911 | A1* | 4/2016 | Newman | F01M 13/02 123/568.11 |

FOREIGN PATENT DOCUMENTS

| | | | | |
|---|---|---|---|---|
| FR | 3015909 | A1 | 7/2015 | |
| JP | WO 2015/087506 | A1 * | 6/2015 | ............. F02M 25/08 |
| WO | 2015087506 | A1 | 6/2015 | |
| WO | WO 2015/101750 | A1 * | 7/2015 | ............. B01D 45/06 |

\* cited by examiner

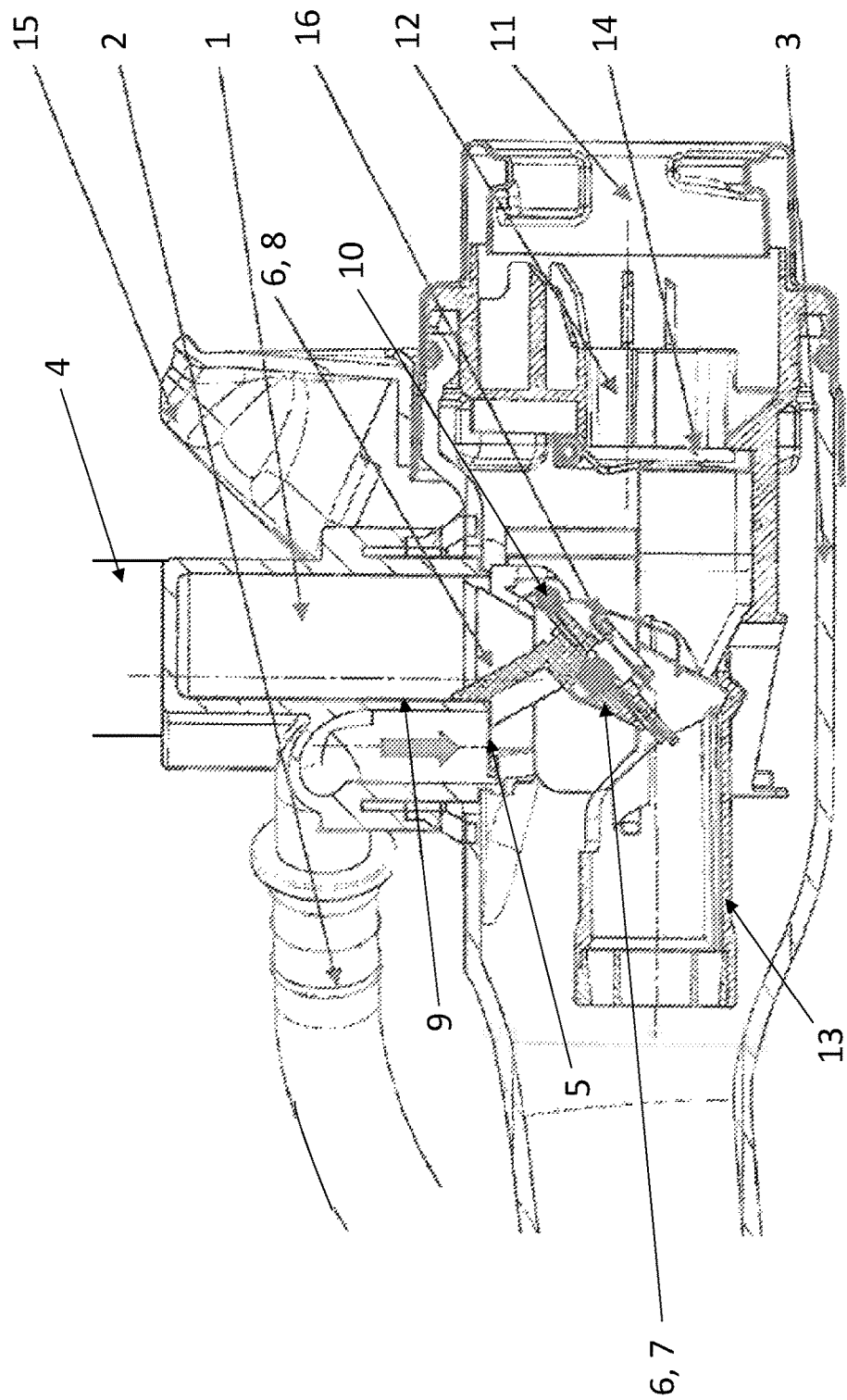

SEPARATOR NIPPLE

CROSS-REFERENCE TO RELATED APPLICATIONS

The present application claims priority 35 U.S.C. § 119 to European Patent Publication No. EP 16167253.0 (filed on Apr. 27, 2016), which is hereby incorporated by reference in its entirety.

TECHNICAL FIELD

Embodiments relate to a separation nipple for separating liquid from a vent inlet line into a filler pipe of a motor vehicle, and a tank installation for a motor vehicle comprising such a separation nipple.

BACKGROUND

There is already a known practice of installing separation nipples on filler pipes which are connected to a vent line of a tank and, on the other hand, have outlet lines leading to a fuel vapour filter, in particular, an activated carbon filter. Fuel vapour escaping from the tank can be passed through an installation of this kind to the activated carbon filter, wherein, on the flow path of the vapour, the separation nipple ensures as complete separation of the liquid fuel as possible from the gas carried onwards in the direction of the activated carbon filter. The liquid fuel separated out can be discharged into the filler pipe via an opening of the separation nipple and can flow back into the tank via said pipe.

Another known practice when opening a tank flap on pressurized tank systems is to abruptly discharge any possible excess pressure in the tank system by opening a solenoid valve. "Instant venting" of this kind is intended to avoid fuel spray escaping due to the excess pressure in the tank. However, instant venting leads to such a high pulse-type volume flow that inadequate liquid separation may lead to liquid fuel being transferred to the activated carbon filter and, in turn, may lead to a fuel spray from the filler head.

SUMMARY

Embodiments relate to a separation nipple for separating liquid from a vent inlet line into a filler pipe of a motor vehicle. Such a separation nipple reduces the negative effects in the case of instant venting and, in particular, prevents or at least reduces the emergence of fuel spray from the filler head.

Embodiments relate to a tank installation for a motor vehicle comprising such a separation nipple.

In accordance with embodiments, a separation nipple for separating liquid from a vent inlet line into a filler pipe of a motor vehicle, includes at least one of: an inlet, configured for connection to the vent inlet line, an outlet configured for connection to a vent outlet line, an opening configured for connection to the interior of the filler pipe, and a flap to close the opening, wherein the flap includes a main flap surface and a reflector flap surface which slopes relative to the main flap surface, wherein the opening is closed by the main flap surface when the flap is closed, and the reflector flap surface forms a reflector together with the main flap surface when the flap is open, which reflector is configured to deflect liquid passing through the opening in the direction of the tank end of the filler pipe.

In accordance with embodiments, a flap for closing the opening through which separated liquid can enter the filler pipe is formed with two surfaces that slope relative to one another, namely a main flap surface, which serves to close the opening, and a reflector flap surface, which serves to deflect outflowing liquid or fuel vapour away from the open end of the filler pipe or the filler head, and thus, towards the inner end of the filler pipe, that closer to the tank. It is thereby possible to reduce the emergence of fuel at the open end of the filler pipe and thus the occurrence of fuel spray.

In accordance with embodiments, a "reflector" is defined as an object which is shaped in such a way that it is to deflect a medium, in the present case a liquid such as fuel. Such a reflector may perform such deflection via sloping surfaces which together form a substantially concave shape from the perspective of the liquid flowing out of the opening and striking the reflector.

In accordance with embodiments, the terms "connected" and "can be connected" are defined as being connected or ability to be connected in such a way that fluid flow is made possible, i.e., connected in terms of flow or the ability to be connected in terms of flow.

In accordance with embodiments, the reflector flap surface may slope at a predetermined angle relative to the main flap surface. The predetermined angle may be between 30 and 150 degrees, or between 60 and 120 degrees. The predetermined angle may be about 90 degrees, or about 100 degrees.

In accordance with embodiments, the reflector flap surface may be formed integrally with the main flap surface. Alternatively, the reflector flap surface may be secured on the main flap surface, preferably by a material bond.

In accordance with embodiments, the separation nipple comprises at least one partition wall for separation. Alternatively or additionally, the separation nipple may also comprise a cyclone for separation.

In accordance with embodiments, the reflector flap surface may be configured to block a flow path to the outlet for liquid passing through the opening when the flap is open, in particular, by virtue of the fact that the reflector flap surface rests, contacts, or otherwise abuts against a partition wall of the separation nipple. It is thereby possible to close an exit for liquid emerging from the opening to the activated carbon filter.

In accordance with embodiments, the reflector flap surface itself may be configured to form a partition wall of the separation nipple when the flap is in a closed position or state. Consequently, the flap has a multi-functional use since, apart from being used to close the opening and to reflect separated liquid or vapour, it is also used to separate liquid.

In accordance with embodiments, the flap may be mounted or otherwise positioned to pivot about a pivot axis between an open position and a closed position. The pivot axis is arranged at one end of the main flap surface.

In accordance with embodiments, the reflector flap surface may be connected to the main flap surface adjacent to the pivot axis, or may merge into the main flap surface at the pivot axis if the main flap surface and the reflector flap surface are of integral design.

In accordance with embodiments, a tank installation for a motor vehicle may include at least one of: a tank, a vent inlet line connected to the tank, a filler pipe for refuelling the tank, a vent outlet line connected to a fuel vapour filter, and a separation nipple as described herein, wherein the inlet of the separation nipple is connected to the vent inlet line, the outlet of the separation nipple is connected to the vent outlet line, and the opening of the separation nipple is connected to the interior of the filler pipe. Such a configuration enables separated liquid to flow off through the opening into the interior of the filler pipe. The flap of the separation nipple may be arranged under the opening leading to the filler pipe in such a way that the reflector flap surface forms a reflector together with the main flap surface when the flap is in an open position or state, which reflector deflects liquid passing through the opening in the direction of the tank end of the filler pipe.

In accordance with embodiments, the pivot axis of the flap may be arranged at an end of the main flap surface of the flap which is closer to a tank cap of the filler pipe. It is approximately at this pivot axis that the transition from the main flap surface to the reflector flap surface is also located, with the result that the reflecting angle of less than 180 degrees between the main flap surface and the reflector flap surface faces the tank end of the filler pipe.

In accordance with embodiments, the flap may be arranged in the filler pipe in such a way that it is to pivot by a fuel nozzle inserted into the filler pipe in such a way that the opening is closed.

In accordance with embodiments, the tank installation may optionally include at least one valve such as a solenoid valve, which is designed in such a way so as to be placed in an actuated state or opened state, when a tank flap or a tank cap is opened. In this way, any excess pressure in the tank via the vent inlet line is dissipated.

DRAWINGS

Embodiments will be illustrated by way of example in the drawings and explained in the description below.

FIG. 1 illustrates a sectional view of a region of a tank installation around the separation nipple of the tank installation, in accordance with embodiments.

DESCRIPTION

As illustrated in FIG. 1, a tank installation in accordance with embodiments includes a vent inlet line 2 connected to a tank (not shown), a filler pipe 3 configured to refuel the tank, a vent outlet line 4 connected to a fuel vapour filter (not shown), and a separation nipple 1. The inlet of the separation nipple 1 is connected to the vent inlet line 2, and the outlet of the separation nipple 1 is connected to the vent outlet line 4. An opening 5 of the separation nipple 1 is connected to the interior of the filler pipe 3 since the opening 5 opens directly into the filler pipe 3. The filler pipe 3 has a holder 15 for fastening.

A flap 6 is arranged in the lower region of the separation nipple 1, thus allowing the opening 5 to be closed via the flap 6. The flap 6 has a main flap surface 7 for closing the opening 5, and a reflector flap surface 8 which slopes at a predetermined angle relative to the main flap surface 7. The reflector flap surface 8 forms a reflector together with the main flap surface 7 when the flap 6 is open, which reflector is to deflect liquid passing through the opening 5 in the direction of the tank end of the filler pipe 3. The reflector flap surface 8 slopes at an angle of about 90 degrees to the main flap surface 7.

Opposite the end of the tank, the filler pipe 3 has a refueling opening, which is configured to be closed via a tank cap 11. A fixing insert 12 and an grounding flap 14 are arranged between the tank cap 11 and flap 6. A flow guide 13 for guiding the fuel during refuelling is arranged on the opposite side of flap 6, which is closer to the tank. To separate liquid fuel from inflowing fuel vapour, the separation nipple 1 has partition walls 9. The reflector flap surface 8 is to block a flow path to the outlet for liquid passing through the opening 5 when flap 6 is open, i.e., in the direction of the vent outlet line 4. The reflector flap surface 8 rests against a partition wall 9 of the separation nipple 1. When flap 6 is in a closed position or state, the reflector flap surface 8 forms an additional partition wall of the separation nipple 1.

The main flap surface 7 of flap 6 has a float valve 16 on its underside. The float valve 16 serves to avoid a transfer of fuel into the venting system via a recirculation bore when flap 6 is closed during refuelling, if a filler nozzle does not switch off.

Flap 6 is arranged for pivoting about a pivot axis 10 between an open position and a closed position. The pivot axis 10 is arranged at one end of the main flap surface 7. It is also in the region of this pivot axis 10 that the reflector flap surface 8 merges into the main flap surface 7. By inserting a filler nozzle into the filler pipe 3 from the side of the tank cap 11, flap 6 can be pivoted upwards to close the opening 5.

When flap 6 is in an open position, separated fuel may be deflected from the opening 5 by the reflecting action of the reflector flap surface 8 and the main flap surface 7 of flap 6 in the direction of the tank end, through the filler pipe 3 and in part through the flow guide 13.

The term "coupled" or "connected" may be used herein to refer to any type of relationship, direct or indirect, between the components in question, and may apply to electrical, mechanical, fluid, optical, electromagnetic, electromechanical or other connections. In addition, the terms "first," "second, etc. are used herein only to facilitate discussion, and carry no particular temporal or chronological significance unless otherwise indicated.

This written description uses examples to disclose the invention, including the preferred embodiments, and also to enable any person skilled in the art to practice the invention, including making and using any devices or systems and performing any incorporated methods. The patentable scope of embodiments is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, may be mixed and matched by one of ordinary skill in the art to construct additional embodiments and techniques in accordance with principles of this application.

LIST OF REFERENCE SIGNS 1 separation nipple
2 vent inlet line
3 filler pipe
4 vent outlet line
5 opening
6 flap
7 main flap surface
8 reflector flap surface
9 partition wall
10 pivot axis
11 tank cap
12 fixing insert
13 flow guide
14 grounding flap 15 holder
16 float valve

What is claimed is:

1. A separation nipple to separate a liquid from a vent inlet line into a filler pipe of a motor vehicle, the separation nipple comprising:
   a separation nipple inlet for connection to the vent inlet line;
   a separation nipple outlet for connection to a vent outlet line;
   a separation nipple opening for connection to an interior of the filler pipe; and
   a flap having a main flap surface to close the a separation nipple opening when the flap is in a closed position, and a reflector flap surface which extends from and slopes at a predetermined angle relative to the main flap surface to block a flow path of the liquid in a direction towards the vent outlet line when the flap is in an open position, the reflector flap surface and the main flap surface configured to form a reflector when the flap is in the open position, to thereby deflect the liquid passing through the separation nipple opening in a direction towards an end of the tank of the filler pipe.

2. The separation nipple of claim 1, wherein the predetermined angle is between 30 degrees and 150 degrees.

3. The separation nipple of claim 1, wherein the predetermined angle is between 60 degrees and 120 degrees.

4. The separation nipple of claim 1, wherein the predetermined angle is about 90 degrees.

5. The separation nipple of claim 1, wherein the predetermined angle is about 100 degrees.

6. The separation nipple of claim 1, wherein the separation nipple comprises at least one separation nipple partition wall.

7. The separation nipple of claim 6, wherein the reflector flap surface is configured to abut against the at least one partition wall in order to block the fluid flow path of the liquid to the outlet.

8. The separation nipple of claim 1, wherein the reflector flap surface, when the flap is in the closed position, forms an additional partition wall.

9. The separation nipple of claim 1, wherein the flap is configured to pivot about a pivot axis between the open position and the closed position.

10. The separation nipple of claim 9, wherein the pivot axis is arranged at an end of the main flap surface.

11. The separation nipple of claim 9, wherein the reflector flap surface is connected to the main flap surface adjacent to the pivot axis.

12. The separation nipple of claim 9, wherein the reflector flap surface merges into the main flap surface at the pivot axis.

13. A tank installation for a motor vehicle, the tank installation comprising:
   a tank;
   a vent inlet line for connection to the tank;
   a filler pipe configured to refuel the tank;
   a vent outlet line for connection to a fuel vapour filter; and
   a separation nipple that includes:
      a separation nipple inlet for connection to the vent inlet line;
      a separation nipple outlet for connection to a vent outlet line;
      a separation nipple opening for connection to an interior of the filler pipe; and
      a flap having a main flap surface to close the separation nipple opening when the flap is in a closed position, and a reflector flap surface which extends from and slopes at a predetermined angle relative to the main flap surface, to block a flow path of the liquid in a direction towards the vent outlet line when the flap is in an open position, the reflector flap surface and the main flap surface configured to form a reflector when the flap is in the open position, to thereby deflect liquid passing through the separation nipple opening in a direction towards an end of the tank of the filler pipe.

14. The tank installation of claim 13, wherein the flap is configured to pivot about a pivot axis between the open position and the closed position.

15. The tank installation of claim 14, wherein the pivot axis is arranged at an end of the main flap surface.

16. The tank installation of claim 13, wherein the flap is arranged in the filler pipe in such a way that it is pivoted to close the separation nipple opening by insertion of a fuel nozzle into the filler pipe.

17. The tank installation of claim 13, further comprising at least one valve configured for actuation by opening of a tank flap or a tank cap.

18. A motor vehicle, comprising:
   a filler pipe;
   a vent inlet line;
   a vent outlet line:
   a separation nipple to separate liquid fuel from the vent inlet line into the filler pipe, the separation nipple including a separation nipple inlet for connection to the vent inlet line, a separation nipple outlet for connection to the vent outlet line, a separation nipple opening for connection to the filler pipe to discharge the separated liquid fuel into the filler pipe, and separation nipple partition walls to separate the liquid fuel from fuel vapour; and
   a flap pivotably moveable between a first position and a second position, the flap having a main flap surface to close the separation nipple opening when the flap is in the first position, and a reflector flap surface to rest against one of the separation nipple partition walls and thereby prevent flow of the liquid into the vent outlet line when the flap is in the second position, the reflector flap surface and the main flap surface configured to deflect, when the flap is in the second position, the liquid fuel that passes through the separation nipple opening towards a direction of a tank end of the filler pipe.

* * * * *